United States Patent
Xu et al.

(10) Patent No.: US 12,279,275 B2
(45) Date of Patent: Apr. 15, 2025

(54) TRANSMISSION PARAMETER DETERMINATION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Jing Xu, Guangdong (CN); Bin Liang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 342 days.

(21) Appl. No.: 17/886,459

(22) Filed: Aug. 12, 2022

(65) Prior Publication Data
US 2022/0386360 A1   Dec. 1, 2022

Related U.S. Application Data

(63) Continuation of application No. PCT/CN2020/075407, filed on Feb. 14, 2020.

(51) Int. Cl.
*H04W 72/23* (2023.01)
(52) U.S. Cl.
CPC ............... *H04W 72/23* (2023.01)
(58) Field of Classification Search
None
See application file for complete search history.

(56) References Cited

U.S. PATENT DOCUMENTS

| | | | |
|---|---|---|---|
| 2019/0373588 A1* | 12/2019 | Bae | H04L 5/0044 |
| 2019/0394759 A1 | 12/2019 | Ying et al. | |
| 2020/0022144 A1 | 1/2020 | Papasakellariou et al. | |
| 2022/0007411 A1* | 1/2022 | Takeda | H04W 72/23 |

FOREIGN PATENT DOCUMENTS

CN  110536399  12/2019

OTHER PUBLICATIONS

"Search Report of of counterpart Europe application No. 20918563.6", issued on Feb. 20, 2023, p. 1-p. 8.
"International Search Report (Form PCT/ISA/210) of PCT/CN2020/075407", mailed on Nov. 20, 2020, with English translation thereof, pp. 1-4.
"Written Opinion of the International Searching Authority (Form PCT/ISA/237) of PCT/CN2020/075407", mailed on Nov. 20, 2020, with English translation thereof, pp. 1-9.
NTT Docomo, Inc., "Maintenance for DL/UL data scheduling and HARQ procedure," 3GPP TSG RAN WG1 Meeting #94bis, Chengdu, China R1-1811375, Oct. 2018, pp. 1-15.
3GPP TSG RAN WG1 Meeting #100 R1-20xxxxx, MCC Support, Draft Report of 3GPP TSG RAN WG1 #99 v0.1.0, Nov. 2019. 153 Pages.

* cited by examiner

*Primary Examiner* — Lonnie V Sweet
(74) *Attorney, Agent, or Firm* — Hodgson Russ LLP

(57) ABSTRACT

The disclosure discloses a transmission parameter determination method, a terminal device, a network device, a chip, a computer-readable storage medium, a computer program product and a computer program. The method includes: the terminal device receives a first transmission parameter; the first transmission parameter is used to determine the number of bits of the first indication field in the DCI; the first transmission parameter and the second transmission parameter correspond to the first indication field in the DCI.

18 Claims, 3 Drawing Sheets

51、Terminal receives ConfiguredGrantConfig and PUSCH-Config

52、Terminal receives the DCI that activates the Configured Grant, parses the DCI that activates the CG according to the corresponding transmission parameter set configuration determined by to the DCI format of the DCI that activates the Configured Grant

TRANSMISSION PARAMETER DETERMINATION METHOD, TERMINAL DEVICE, AND NETWORK DEVICE

CROSS-REFERENCE TO RELATED APPLICATION

This application is a continuation of international PCT application serial no. PCT/CN2020/075407, filed on Feb. 14, 2020. The entirety of the above-mentioned patent application is hereby incorporated by reference herein and made a part of this specification.

TECHNICAL FIELD

The present disclosure relates to the field of communications, and in particular, to a transmission parameter determination method, a terminal device, a network device, a chip, a computer-readable storage medium, a computer program product, and a computer program.

DESCRIPTION OF RELATED ART

In the related art, the order and the number of bits of each filed in the downlink control information (DCI) format are determined. In configured grant (CG) transmission, the bits of each domain in the activation and retransmission DCI may be determined by different parameters. Under multiple DCI formats corresponding to different transmission parameter configurations, the number of bits in the same indication field will vary. Therefore, it is necessary to solve the problem of different number of bits of a certain indication field in the DCI corresponding to different transmission parameter set configurations.

SUMMARY

In order to solve the above technical problems, embodiments of the present disclosure provide a transmission parameter determination method, a terminal device, a network device, a chip, a computer-readable storage medium, a computer program product, and a computer program.

In a first aspect, a transmission parameter determination method is provided, including:

The terminal device receives a first transmission parameter.

The first transmission parameter is used to determine the number of bits of the first indication field in the DCI (downlink control information); a first transmission parameter and a second transmission parameter correspond to the first indication field in the DCI.

In a second aspect, a transmission parameter determination method is provided, including:

The network device sends the first transmission parameter.

The first transmission parameter is used to determine the number of bits of the first indication field in the DCI; the first transmission parameter and the second transmission parameter correspond to the first indication field in the DCI.

In a third aspect, a terminal device is provided, including:

A first communication unit receives the first transmission parameter.

The first transmission parameter is used to determine the number of bits of the first indication field in the DCI; the first transmission parameter and the second transmission parameter correspond to the first indication field in the DCI.

In a fourth aspect, a network device is provided, including:

A second communication unit sends the first transmission parameter.

The first transmission parameter is used to determine the number of bits of the first indication field in the DCI; the first transmission parameter and the second transmission parameter correspond to the first indication field in the DCI.

In a fifth aspect, a terminal device is provided, including: a processor and a memory for storing a computer program that can be executed on the processor.

The memory is used to store a computer program, and the processor is used to invoke and execute the computer program stored in the memory to execute the steps of the method as described above.

In a sixth aspect, a network device is provided, including: a processor and a memory for storing a computer program that can be executed on the processor.

The memory is used to store a computer program, and the processor is used to invoke and execute the computer program stored in the memory to execute the steps of the method as described above.

In a seventh aspect, a chip is provided, including: a processor which is used to invoke and execute a computer program from a memory, so that a device installed with the chip executes the aforementioned method.

In an eighth aspect, a computer-readable storage medium is provided. The computer-readable storage medium is used for storing a computer program, and the computer program makes a computer to execute the steps of the aforementioned method.

In a ninth aspect, a computer program product is provided, including computer program instructions, and the computer program instructions make a computer to perform the aforementioned method.

In a tenth aspect, a computer program is provided. The computer program makes a computer to perform the aforementioned method.

By adopting the above solution, the first transmission parameter sent by the network device to the terminal device is limited by the second transmission parameter; and the first transmission parameter and the second transmission parameter correspond to the first indication field in the DCI. Therefore, the transmission parameters corresponding to the indication field of the same DCI have a constraint relationship, which may solve the problem of different number of bits of a certain indication field in the DCI corresponding to different transmission parameter.

DESCRIPTION OF THE EMBODIMENTS

In order to facilitate comprehensive understanding of the features and technical contents of the embodiments of the present disclosure, the implementation of the embodiments of the present disclosure will be described in detail below with reference to the accompanying drawings. The accompanying drawings are for reference only and are not used to limit the embodiments of the present disclosure.

The technical solutions in the embodiments of the present disclosure will be described below with reference to the accompanying drawings in the embodiments of the present disclosure. Clearly, the described embodiments are part of the embodiments of the present disclosure, not all of the embodiments. Based on the embodiments in the present disclosure, all other embodiments obtained by those of ordinary skill in the art without creative efforts shall fall within the protection scope of the present disclosure.

The technical solutions of the embodiments of the present disclosure may be applied to various communication systems, for example: Global System of Mobile communication (GSM) system, LTE Frequency Division Duplex (FDD) system, LTE Time Division Duplex (Time Division Duplex, TDD), 5G communication system or future communication system, etc.

Figure 1:
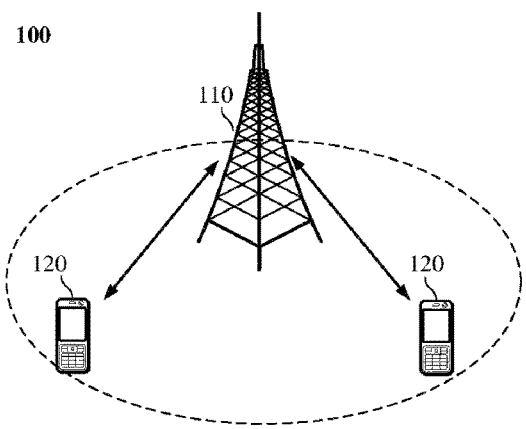
FIG. 1 is a schematic view 1 of a communication system architecture according to an embodiment of the present disclosure.

Exemplarily, a communication system 100 to which this embodiment of the present disclosure is applied may be as shown in FIG. 1. The communication system 100 may include a network device 110, and the network device 110 may be a device that communicates with the UE 120 (or referred to as a communication terminal device, a terminal device). The network device 110 may provide communication coverage for a particular geographic area and may communicate with UEs located within the coverage area. Optionally, the network device 110 may be a network device (Base Transceiver Station, BTS) in a GSM system or a CDMA system, or a network device (NodeB, NB) in a WCDMA system, or an evolution network device (Evolutional Node B, eNB or eNodeB) in an LTE system, or a wireless controller in a cloud radio access network (CRAN), or the network device may be a mobile exchange center, a relay station, an access point, a vehicle-mounted device, a wearable device, a hubs, an exchanger, a bridge, a router, a network-side device in 5G network or a network device in a future evolution network, etc.

The communication system 100 further includes at least one UE 120 located within the coverage of the network device 110. There may be wired communication or wireless communication between the UE 120 and the network device 110. A UE that communicates wirelessly with the network device 110 may be referred to as a "wireless communication terminal device", a "wireless terminal device" or a "mobile terminal device".

It should be understood that the terms "system" and "network" are often used interchangeably herein. The term "and/or" in this disclosure is only an association relational term for describing the relationship between associated objects, indicating that there can be three kinds of relationships, such as A and/or B, which can mean that A exists alone, A and B exist simultaneously, and B exists alone. In addition, the character "/" in this disclosure generally indicates that there is an "or" relationship between the associated objects.

In order to facilitate comprehensive understanding of the features and technical contents of the embodiments of the present disclosure, the implementation of the embodiments of the present disclosure will be described in detail below with reference to the accompanying drawings. The accompanying drawings are for reference only and are not used to limit the embodiments of the present disclosure.

Figure 2:
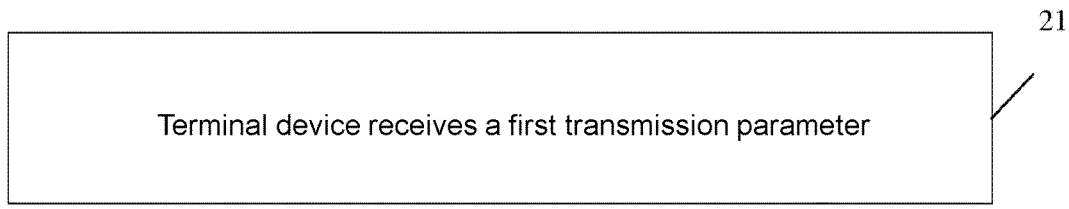
FIG. 2 is a schematic flowchart 1 of a transmission parameter determination method according to an embodiment of the present disclosure.

An embodiment of the present disclosure provides a transmission parameter determination method, as shown in FIG. 2, including:

Step 21: A terminal device receives a first transmission parameter.

The first transmission parameter is used to determine the number of bits of a first indication field in the DCI; the first transmission parameter and the second transmission parameter correspond to the first indication field in the DCI.

Figure 3:
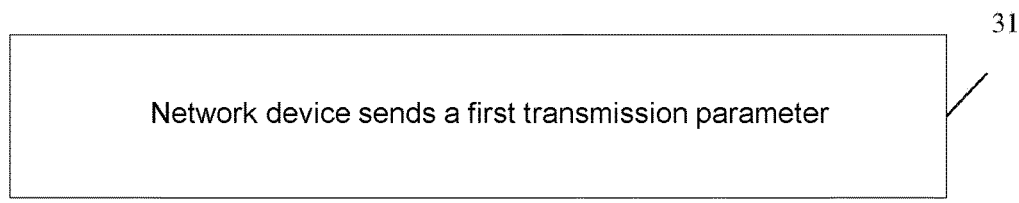
FIG. 3 is a schematic flowchart 2 of a transmission parameter determination method according to an embodiment of the present disclosure.

An embodiment of the present disclosure further provides a transmission parameter determination method, as shown in FIG. 3, including:

Step 31: A network device sends a first transmission parameter.

The first transmission parameter is used to determine the number of bits of a first indication field in the DCI; the first transmission parameter and a second transmission parameter correspond to the first indication field in the DCI.

In a solution provided by this embodiment, the solution may further include that the terminal device receives the second transmission parameter sent by the network device.

Specifically, the step may be that the terminal device receives the second transmission parameter sent by the network device.

Still further, the terminal device may receive the first transmission parameter and the second transmission parameter sent by the network device.

The first transmission parameter includes: at least one transmission parameter among the transmission parameters of the CG (Configured Grant).

And/or, the second transmission parameter includes: at least one transmission parameter among uplink data transmission parameters, or at least one transmission parameter agreed by a protocol.

It should be understood that both the first transmission parameter and the second transmission parameter may include one or more transmission parameters. When the first transmission parameter includes multiple transmission parameters, the first transmission parameter may be referred to as the first transmission parameter set. Similarly, the second transmission parameter may be regarded as the second transmission parameter set when including multiple transmission parameters.

The first transmission parameter set (or the second transmission parameter set) may be regarded as the configuration parameter. The first transmission parameter set configuration (or the second transmission parameter set configuration)

may be regarded as the configuration of the first transmission parameter set, or the configuration of the second transmission parameter set, that is, the value of the configuration parameter. For example, rbg size is the first transmission parameter, and rbg size=3, 3 is the first transmission parameter configuration.

The uplink data transmission parameter may be a transmission parameter set configuration of a PUSCH (Physical Uplink Share Channel).

The number of bits of the first indication field determined based on the first transmission parameter is not greater than the number of bits of the first indication field determined based on the second transmission parameter. It may be understood that the first transmission parameter set configuration is limited by the second transmission parameter set configuration. More specifically, the following may be included:

The number of bits of the first indication field determined based on the first transmission parameter is less than the number of bits of the first indication field determined based on the second transmission parameter.

Or, the number of bits of the first indication field determined based on the first transmission parameter is equal to the number of bits of the first indication field determined based on the second transmission parameter.

Based on the above description, the present embodiment is described in detail below with reference to examples.

Example 1

This example is applicable to all DCI formats used for uplink scheduling and supported by the terminal. The second transmission parameter is a transmission parameter corresponding to the first indication field with the least number of bits in all DCI formats used for uplink scheduling.

Specifically, the second transmission parameter set configuration is a transmission parameter set configuration of the first indication field corresponding to the least number of bits in all DCI formats used for uplink scheduling.

Further, in this example, the transmission parameter of the first indication field corresponding to the least number of bits in all DCI formats used for uplink scheduling is interpreted as: the transmission parameter of the first indication field with the least number of bits in all DCI formats used for uplink scheduling, which is used as the second transmission parameter.

In addition, all DCI formats used for uplink scheduling include at least: a DCI format 0-1 and a DCI format 0-2.

Or, all DCI formats used for uplink scheduling at least include: a DCI format 0-0, a DCI format 0-1, and a DCI format 0-2.

For example, the number of bits of the first indication field determined by the first parameter (set) configuration in ConfiguredGrantConfig is less than or equal to the number of bits of the first indication field determined by the related second parameter (set) configuration in PUSCH-Config. The number of bits of the first indication field determined by the second parameter (set) is the minimum value of the number of bits of the first indication field in all DCI formats supported by the terminal (or all DCI formats used for uplink scheduling).

Take the first indication field as the antenna port field as an example.

The DMRS configuration parameter for DCI format 0-1 in PUSCH-Config (that is, the aforementioned uplink data transmission parameter), such as dmrs-UplinkForPUSCH-MappingTypeA and dmrs-UplinkForPUSCH-MappingTypeB, is configured to: support multi-port transmission, and has 3 bits according to the antenna port field (which can be regarded as the first indication field in this example) in the configured DCI format 0-1.

The DMRS configuration parameter for DCI format 0-2 in PUSCH-Config (that is, the aforementioned uplink data transmission parameter), such as dmrs-UplinkForPUSCH-MappingTypeA-DCI format 0-2 and dmrs-UplinkFor-PUSCH-MappingTypeB-DCI format 0-2, is not configured, that is, has 0 bit according to the antenna port field in the configured DCI format 0-2.

The antenna port field in DCI format 0-0 in PUSCH-Config (that is, the aforementioned uplink data transmission parameter) does not exist. Or, the antenna port field in DCI format 0-0 agreed by the protocol does not exist.

The antenna port field in DCI format 0-0 does not exist, and which may be interpreted that this field has 0 bit.

Since it is limited in this example that the second transmission parameter set configuration is the transmission parameter set configuration of the first indication field corresponding to the least number of bits in all DCI formats used for uplink scheduling, it means that the second transmission parameter set configuration is the transmission parameter set configuration corresponding to DCI format 0-0 or DCI format 0-2.

Correspondingly, since it is limited in the example that the number of bits of the first indication field determined based on the first transmission parameter set configuration is not greater than the number of bits of the first indication field determined based on the second transmission parameter set configuration, it means that the second transmission parameter set configuration determines that the number of bits of the first indication field is 0, then the number of bits of the first indication field configured by the first transmission parameter set configuration are also 0. That is to say, it corresponds to the situation that the number of bits of the first indication field determined based on the first transmission parameter set is equal to the number of bits of the first indication field determined based on the second transmission parameter set.

In combination with the foregoing, for example, the DMRS configuration parameter (that is, the first transmission parameter) in ConfiguredGrantConfig, such as cg-DMRS-Configuration, is limited to all DCI formats, such as the configuration of DCI formats 0-0/0-1/0-2, therefore, cg-DMRS-Configuration is not configured.

The above description of the first transmission parameter (set) configuration and the second transmission parameter (set) configuration is also applicable to the terminal device side and the network device side.

Figure 4:
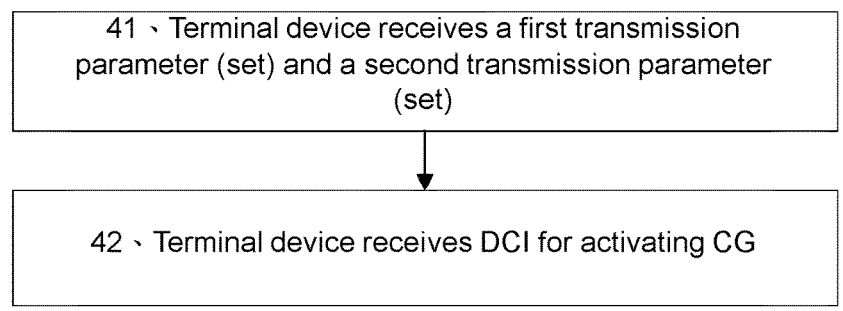
FIG. 4 is a schematic flowchart 3 of a transmission parameter determination method according to an embodiment of the present disclosure.

This example is described with reference to FIG. 4, which may include:

Step 41: The terminal device receives the first transmission parameter (set) and the second transmission parameter (set).

For example, the terminal device receives ConfiguredGrantConfig (Configuration of CG) and PUSCH-Config (Physical Uplink Share Channel Configuration). The descriptions related the first transmission parameter set configuration and the second transmission parameter set configuration are the same as those described above, and will not be repeated here.

Step 42: The terminal device receives the DCI that activates the Configured Grant.

In this step, the method further includes: determining the number of bits of the first indication field in the DCI for activating the Configured Grant; and the terminal device parses the first indication field according to the first transmission parameter (set) configuration.

The DCI format for activating the Configured Grant is one of all the DCI formats used for uplink scheduling, or one of all the DCI formats for activating the Configured Grant.

The first indication field is one of at least one indication field of the DCI for activating the Configured Grant.

The step of determining the number of bits of the first indication field in the DCI that activates the Configured Grant may be: determining the number of bits of the first indication field according to at least one transmission parameter in the uplink data transmission parameters.

Further, the step of determining the number of bits of the first indication field in the DCI for activating the Configured Grant may be: determining the number of bits of the first indication field according to at least one transmission parameter in the uplink data transmission parameters corresponding to the DCI format for activating the Configured Grant.

The first indication field is one of multiple DCI fields included in the DCI that activates the Configured Grant. That is to say, one DCI may contain multiple indication fields, and these indication fields can be respectively interpreted as the first indication field. Different first indication fields may correspond to different second transmission parameter (set) configurations and first transmission parameter (set) configurations (on the network device side). However, for different first indication fields, the constraint rules for the related second transmission parameter (set) configuration and the first transmission parameter (set) configuration are the same as those described above in this example, so no further description is incorporated herein.

For example, the DCI that activates the Configured Grant received by the terminal adopts the DCI format 0-1. According to the DMRS configuration parameter for DCI format 0-1 in PUSCH-Config (that is, at least one transmission parameter in the uplink data transmission parameter corresponding to the DCI format that activates the Configured Grant), such as dmrs-UplinkForPUSCH-MappingTypeA and dmrs-UplinkForPUSCH-MappingTypeB, it is determined that the antenna port field (that is, the first indication field) has 3 bits.

According to the DMRS configuration parameter (the first transmission parameter) in the Configured Grant, such as cg-DMRS-Configuration, it is not configured. The terminal does not interpret the antenna port field. By default, the antenna port is a single port and the port number is 0. Correspondingly, the network device side may determine, according to the first transmission parameter (set) configuration, that no configuration is to be performed in the first indication field in the sent DCI that activates Configured Grant.

It should also be pointed out that although the above example takes the DMRS port parameter configuration as an example, in actual practice, the first transmission parameter or the second transmission parameter is at least one of the following:

Demodulation reference signal (DMRS) port related parameters, frequency domain frequency hopping parameters, frequency domain resource parameters, parameters of uplink control information (UCI) multiplexed to physical uplink share channel (PUSCH), and DMRS sequence initialization parameters.

When the first transmission parameter or the second transmission parameter is a parameter set, the first transmission parameter set or the second transmission parameter set is at least one of the following:

Frequency domain frequency hopping parameter set (for example, frequencyHopping), frequency domain resource parameter set (for example, ResourceAllocationType1-Granularity), parameter set (for example, uci-onPUSCH) of uplink control information (UCI) multiplexed to the physical uplink share channel (PUSCH), DMRS sequence initialization parameter set (for example, DMRSsequenceinitialization), and DMRS port related parameter set.

Certainly, in addition to the parameters listed above, the target transmission parameter (set) configuration set may further include more parameters, which may be set according to actual conditions, and will not be further described here.

Example 2

This example applies to all DCI formats used for Configured Grant transmission. The second transmission parameter is a transmission parameter corresponding to the first indication field with the least number of bits in the DCI format used for Configured Grant transmission.

Specifically, the second transmission parameter set configuration is a transmission parameter set configuration of the first indication field corresponding to the least number of bits in the DCI format used for Configured Grant transmission.

In this example, the second transmission parameter is the transmission parameter corresponding to the first indication field with the least number of bits in the DCI format used for the Configured Grant transmission, which can be interpreted as: the first indication field in the DCI format used for Configured Grant transmission determined by the second transmission parameter has the least number of bits.

The DCI used to transmit the Configured Grant may be the DCI used to activate the Configured Grant, or may be the DCI used to retransmit the Configured Grant. In this example, the DCI for activating the Configured Grant is taken as an example for description.

For example, the number of bits of the first indication field determined by the first parameter (set) in ConfiguredGrant-Config is less than or equal to the number of bits of the first indication field determined by the related second parameter (set) in PUSCH-Config.

The number of bits of the first indication field determined by the second parameter (set) is the minimum value of the number of bits of the first indication field in all DCI formats used to activate the Configured Grant.

Take the first indication field as the antenna port field as an example.

The DMRS configuration parameter for DCI format 0-1 in PUSCH-Config (that is, the aforementioned uplink data transmission parameter), such as dmrs-UplinkForPUSCH-MappingTypeA and dmrs-UplinkForPUSCH-MappingTypeB, is configured to support multi-port transmission, and the antenna port field in DCI format 0-1 having 4 bit is configured according to the DMRS configuration parameter.

DMRS configuration parameter for DCI format 0-2 in PUSCH-Config (that is, the aforementioned uplink data transmission parameter), such as dmrs-UplinkForPUSCH-MappingTypeA-DCI format 0-2 and dmrs-UplinkForPUSCH-MappingTypeB-DCI format 0-2, is configured to support multi-port transmission, and the antenna port field (that is, the first indication field) having 3 bits in DCI format 0-2 is configured according to the SMRS configuration parameter.

The default antenna port field in DCI format 0-0 in PUSCH-Config (that is, the aforementioned uplink data transmission parameter) does not exist, or the first indication field of DCI format 0-0 as agreed in the protocol does not exist.

The pre-configured DCI format 0-1 and DCI format 0-2 are all DCI formats used for Configured Grant transmission, then the second transmission parameter set configuration is the transmission parameter set configuration corresponding to the antenna port field (that is, the first indication field) having 3 bits.

Correspondingly, the number of bits of the first indication field determined based on the first transmission parameter set configuration is not greater than the number of bits of the first indication field determined based on the second transmission parameter set configuration. That is, when the number of bits of the first indication field determined by the second transmission parameter set configuration is 3, then the bits of the first indication field corresponding to the first transmission parameter set configuration are less than or equal to 3 bits.

In combination with the foregoing, for example, the DMRS configuration parameter (that is, the first transmission parameter set) in ConfiguredGrantConfig, such as cg-DMRS-Configuration, is limited to all DCI formats used to activate ConfiguredGrant, such as DCI format 0-1/0-2 configuration. Therefore, cg-DMRS-Configuration may also be configured to support multi-port transmission, and the corresponding antenna port field is 3 bits at maximum, and may be less than 3 bits, such as 2 bits, or may be equal to 3 bits. This example adopts 3 bits as an example.

The above description of the first transmission parameter set configuration and the second transmission parameter set configuration is also applicable to the terminal device side and the network device side.

The processing flow for this example may be:

1. The same as Example 1 and will not be repeated here.
2. The terminal device receives the DCI that activates the Configured Grant.

In this step, the method further includes: determining the number of bits of the first indication field in the DCI for activating the Configured Grant; and the terminal device parses the first indication field according to the first transmission parameter (set) configuration.

The DCI format for activating the Configured Grant is one of all the DCI formats used for uplink scheduling, or one of all the DCI formats for activating the Configured Grant.

The first indication field is one of at least one indication field of the DCI for activating the Configured Grant.

The step of determining the number of bits of the first indication field in the DCI that activates the Configured Grant may be: determining the number of bits of the first indication field according to at least one transmission parameter in the uplink data transmission parameters.

Further, the step of determining the number of bits of the first indication field in the DCI for activating the Configured Grant may be: determining the number of bits of the first indication field according to at least one transmission parameter in the uplink data transmission parameters corresponding to the DCI format for activating the Configured Grant.

For example, the DCI that activates the Configured Grant received by the terminal adopts the DCI format 0-1. According to the DMRS configuration parameter for DCI format 0-1 in PUSCH-Config (that is, at least one transmission parameter in the uplink data transmission parameter corresponding to the DCI format that activates the Configured Grant), such as dmrs-UplinkForPUSCH-MappingTypeA and dmrs-UplinkForPUSCH-MappingTypeB, it is determined that the antenna port field has 4 bits.

Then, according to the DMRS configuration parameter (the first transmission parameter) in the Configured Grant, such as cg-DMRS-Configuration, the terminal device only interprets 3 bits in the antenna port field.

Correspondingly, the network device side may determine, according to the first transmission parameter configuration, to perform configuration corresponding to 3 bits in the first indication field in the sent DCI that activates the Configured Grant.

It should also be pointed out that although the above example takes the DMRS port parameter configuration as an example, in actual practice, the first transmission parameter or the second transmission parameter is at least one of the following:

Demodulation reference signal (DMRS) port related parameters, frequency domain frequency hopping parameters, frequency domain resource parameters, parameters of uplink control information (UCI) multiplexed to physical uplink shared channel (PUSCH), and DMRS sequence initialization parameters.

When the first transmission parameter or the second transmission parameter is a parameter set, the first transmission parameter set or the second transmission parameter set is at least one of the following:

Frequency domain frequency hopping parameter set (for example, frequencyHopping), frequency domain resource parameter set (for example, ResourceAllocationType1-Granularity), parameter set (for example, uci-onPUSCH) of uplink control information (UCI) multiplexed to the physical uplink share channel (PUSCH), DMRS sequence initialization parameter set (for example, DMRSsequenceinitialization), and DMRS port related parameter set.

Certainly, in addition to the parameters listed above, the target transmission parameter (set) configuration set may further include more parameters, which may be set according to actual conditions, and will not be further described here.

Example 3

In this example, the second transmission parameter is the transmission parameter corresponding to the first indication field with the largest number of bits in all DCI formats used for uplink scheduling; or, the first indication field in the DCI format used for Configured Grant transmission determined by the second transmission parameter has the largest number of bits.

That is, the number of bits of the first indication field determined by the first parameter (set) in ConfiguredGrant-Config is less than or equal to the number of bits of the first indication field determined by the related second parameter (set) in PUSCH-Config.

The number of bits of the first indication field determined by the second parameter (set) is the maximum value of the number of bits of the first indication field in all DCI formats used for Configured Grant transmission. Alternatively, the number of bits of the first indication field determined by the second parameter (set) is the maximum value of the number of bits of the first indication field in all DCI formats used for uplink scheduling.

The Configured Grant transmission may be activated Configured Grant or scheduled Configured Grant retransmission.

Take the first indication field as the antenna port field as an example.

The DMRS configuration parameter for DCI format 0-1 in PUSCH-Config (that is, the aforementioned uplink data transmission parameter), such as dmrs-UplinkForPUSCH-MappingTypeA and dmrs-UplinkForPUSCH-MappingTypeB, is configured to support multi-port transmission, and the antenna port field having 4 bits in DCI format 0-1 is configured according to the DMRS configuration parameter. The DMRS configuration parameter for DCI format 0-2, such as dmrs-UplinkForPUSCH-MappingTypeA-DCI format 0-2 and dmrs-UplinkForPUSCH-MappingTypeB-DCI format 0-2, is configured to support multi-port transmission, and the antenna port field having 3 buts in DCI format 0-2 is configured according to the DMRS configuration parameter. The default antenna port field in DCI format 0-0 does not exist.

In this example, the second transmission parameter (set) configuration is the maximum value of the number of bits of the first indication field in all DCI formats supported by the terminal device, and the second transmission parameter (set) configuration may be the DMRS configuration parameter of DCI format 0-1.

The DMRS configuration parameter (first transmission parameters) in ConfiguredGrantConfig, such as cg-DMRS-Configuration, is limited to all DCI formats. Therefore, cg-DMRS-Configuration may also be configured to support multi-port transmission, and the corresponding antenna port field has 4 bits at maximum. That is to say, the number of bits of the first indication field corresponding to the first transmission parameter may be less than 4 bits, for example, may be 2 bits, or 3 bits, and of course may be equal to 4 bits. In this example, 4 bits are adopted as an example.

In another example, if the second transmission parameter (set) configuration is the maximum value of the number of bits of the first indication field in all DCI formats used to activate the Configured Grant, then the second transmission parameter (set) configuration may be DMRS configuration parameter of DCI format 0-1.

Correspondingly, the DMRS configuration parameter (first transmission parameter set) in ConfiguredGrantConfig, such as cg-DMRS-Configuration, is limited to all DCI formats used to activate ConfiguredGrant, such as the configuration of DCI format 0-1/0-2. Therefore, cg-DMRS-Configuration may also be configured to support multi-port transmission, and the corresponding antenna port field has 4 bits at maximum.

Figure 5:
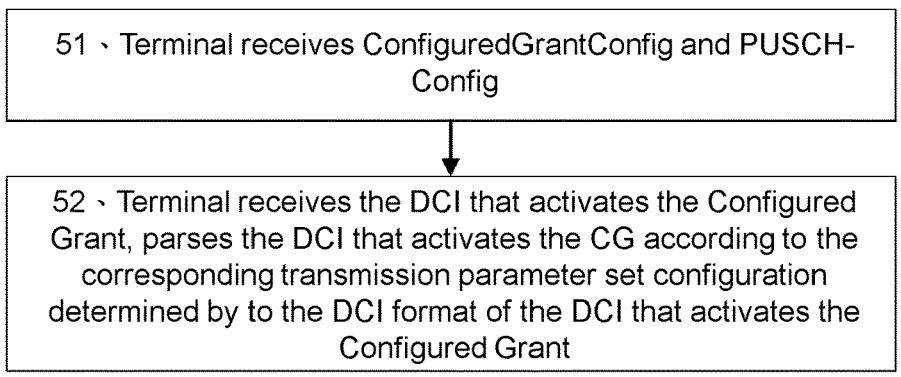
FIG. 5 is a schematic flowchart 4 of a transmission parameter determination method according to an embodiment of the present disclosure.

Description is provided with reference to FIG. 5:

Step 51: The terminal receives ConfiguredGrantConfig and PUSCH-Config.

Step 52: The terminal receives the DCI that activates the Configured Grant, determines the corresponding transmission parameter set configuration according to the DCI DCI format that activates the Configured Grant, and parses the DCI that activates the Configured Grant.

The processing of this step is described in detail in several conditions.

Condition 1: In a case that the DCI for activating the Configured Grant is the third DCI format, parsing the first indication field according to the first transmission parameter.

The third DCI format is DCI format 0-1.

Correspondingly, the network device configures the first indication field according to the first transmission parameter in a case that the DCI to be sent for activating the Configured Grant is the third DCI format.

The method may further include: in a case that the DCI for activating the Configured Grant is the third DCI format, the number of bits of the first indication field is determined according to the second transmission parameter, and paraing the first indication field according to the first transmission parameter.

For example, if the DCI that activates the Configured Grant received by the terminal adopts DCI format 0-1, according to the DMRS configuration parameter (second transmission parameter) for DCI format 0-1 in PUSCH-Config, such as dmrs-UplinkForPUSCH-MappingTypeA and dmrs-UplinkForPUSCH-MappingTypeB, it is determined that the antenna port field has 4 bits.

According to the DMRS configuration parameter (the first transmission parameter) in the Configured Grant, such as cg-DMRS-Configuration, the 4 bits in the antenna port field are parsed.

Condition 2: In the case that the DCI that activates the Configured Grant is the fourth DCI format, parsing the first indication field according to the first transmission parameter.

Alternatively,

In the case that the DCI for activating the Configured Grant is the fourth DCI format, parsing the first indication field according to the second transmission parameter; or, In the case that the DCI for activating the Configured Grant is the fourth DCI format, parsing the first indication field according to the first transmission parameter and the second transmission parameter.

The fourth DCI format is DCI format 0-2.

The method may also include: in the case that the DCI for activating the Configured Grant is the third DCI format, the number of bits of the first indication field is determined according to the second transmission parameter set configuration, and parsing the first indication field according to the first transmission parameter set configuration and/or parsing the first indication field according to the second transmission parameter set configuration.

For example, if the DCI that activates the Configured Grant received by the terminal adopts DCI format 0-2, according to the DMRS configuration parameter (second transmission parameter) for DCI format 0-2 in PUSCH-Config, such as dmrs-UplinkForPUSCH-MappingTypeA-DCIformat0-2 and dmrs-UplinkForPUSCH-MappingTypeB-DCIformat0-2, it is determined that the antenna port field has 3 bits.

Going a step further:

Condition 2.1: The terminal parses the 3 bits in the antenna port field, and determines the information indicated by the antenna port according to the DMRS configuration parameter (the first transmission parameter) in the Configured Grant, such as cg-DMRS-Configuration.

There may be conditions where the bits of the first indication field determined according to the first transmission parameter set configuration are greater than the number of bits of the first indication field determined by the second transmission parameter set configuration, that is:

In a case that the DCI for activating the Configured Grant is the fourth DCI format, if the number of bits of the first indication field determined according to the second transmission parameter set configuration is less than the number of bits of the first indication field determined according to the first transmission parameter set configuration, then the first indication field corresponds to the part of the value corresponding to the first transmission parameter set configuration.

For example, cg-DMRS-Configuration determines that the antenna port supports 16 configurations, namely {0, 1, 2, 3, 4, 5, 6, 7, 0-1, 2-3, 4-5, 6-7, 0-3, 4-7,0-5, 0-7}, but since the antenna port field has only 3 bits, it only corresponds to the first 8 configurations in the configuration, or corresponds to the single-port configuration in the configuration.

Condition 2.2: The terminal parses the 3 bits in the antenna port field, and determines the information indicated by the antenna port (the first indication field) according to the DMRS configuration parameter (second transmission parameter) for DCI format 0-2 in PUSCH-Config, such as dmrs-UplinkForPUSCH-MappingTypeA-DCIformat0-2 and dmrs-UplinkForPUSCH-MappingTypeB-DCIformat0-2. Correspondingly, the network device may configure the information indicated by the first indication field according to the second transmission parameter set configuration.

Condition 2.3: Terminal (or network device) can perform the following:

According to the DMRS configuration parameter (second transmission parameter) for DCI format 0-2 in PUSCH-Config, such as dmrs-UplinkForPUSCH-MappingTypeA-DCIformat0-2 and dmrs-UplinkForPUSCH-MappingTypeB-DCIformat0-2, and the first transmission parameter, such as cg-DMRS-Configuration, jointly determines the information indicated by the antenna port.

In another example, the FDRA field (which can be interpreted as the first indication field) in DCI format 0-2 may be jointly determined according to resource allocation and/or rbg (which can be interpreted as the first transmission parameter) in ConfiguredgrantConfig and ResourceAllocationType1-Granularity (which may be interpreted as the second transmission parameter) in PUSCHConfig.

In condition 3, the second transmission parameter is a transmission parameter corresponding to the first indication field of the first DCI format, and the first DCI format is one of all the DCI formats used for uplink scheduling.

This situation is applicable to the scenario where the DCI format is specified, that is, the second transmission parameter (set) is the transmission parameter corresponding to the first indication field of the specified first DCI format.

The first DCI format is agreed by the protocol or configured by the network. That is, the specified first DCI format is specified by the protocol, for example, in some cases, only the first DCI format can be used for transmission; alternatively, it may be that the network device specifies only the first DCI format is adopted for transmission at a certain occasion (or within a certain period of time).

The first DCI format is DCI format 0-1. Of course, the first DCI format may also be other formats, as long as it is a specified format determined according to a protocol agreement or network device configuration, for example, the first DCI format may be DCI formats 0-2, etc., no further description is provided herein.

In this condition, the second transmission parameter may be used for determining the number of bits of the first indication field in the DCI; then, the first indication field may be parsed through the first transmission parameter (set) configuration. Alternatively, the protocol stipulates that the second transmission parameter (set) configuration is used to parse the first indication field.

For example, the DMRS configuration parameter (second transmission parameter) for DCI format 0-1 in PUSCH-Config, such as dmrs-UplinkForPUSCH-MappingTypeA and dmrs-UplinkForPUSCH-MappingTypeB, is configured to support multi-port transmission, and the antenna port field (the first indication field) having 4 bits in the DCI format 0-1 is configured according to the DMRS configuration parameter.

Then, the 4 bits in the antenna port field may be interpreted (or configured) according to the second transmission parameter (set) configuration (or the first transmission parameter).

In condition 4, the second transmission parameter is a transmission parameter corresponding to the first indication field of the second DCI format, and the second DCI format is one of all the DCI formats used for Configured Grant transmission.

The only difference between this condition and condition 3 is that the second DCI format is one of all DCI formats used for the Configured Grant transmission. Specifically, the second DCI format may also be agreed by a protocol or configured by a network. The second DCI format is DCI format 0-1. Of course, the second DCI format may also be other formats, as long as it is a specified format determined according to a protocol agreement or network device configuration, for example, the second DCI format may be DCI format 0-2, etc., and no further description is not incorporated herein.

The same parts as described in condition 3 will not be repeated here.

Example 4

The foregoing examples mainly focus on the processing of the DCI for activating the Configured Grant, and this example describes the related processing of the DCI for retransmitting the Configured Grant.

The network device sends the DCI that retransmits the Configured Grant; correspondingly, the terminal device receives the DCI that retransmits the Configured Grant.

The DCI format for retransmitting the Configured Grant is consistent with the DCI format for activating the Configured Grant.

The DCI format for activating the Configured Grant needs to be consistent with the scheduling DCI format for retransmitting the Configured Grant.

For example, the terminal receives the first DCI sent by the network device to activate the Configured Grant, and the first DCI is the first DCI format.

The terminal receives the second DCI sent by the network device for scheduling retransmission of the Configured Grant, and the second DCI is the second DCI format. The second DCI format is the same as the first DCI format.

Technical advantages: The initial transmission and retransmission of the Configured Grant can maintain a consistent transmission configuration and reduce the complexity of the terminal.

Correspondingly, the processing method for the DCI configured for retransmitting the Configured Grant may be the same as the foregoing example, and details are not repeated here.

Example 5

The network device sends the DCI that retransmits the Configured Grant; correspondingly, the terminal device receives the DCI that retransmits the Configured Grant.

The DCI format configured for retransmitting the Configured Grant is independent of the DCI format configured for activating the Configured Grant.

The DCI format for activating the Configured Grant may be inconsistent with the scheduling DCI format for retransmitting the Configured Grant.

The terminal receives the first DCI for activating the Configured Grant, and the first DCI is the first DCI format.

The terminal receives the second DCI for scheduling the retransmission of the Configured Grant, and the second DCI is a second DCI format. The second DCI format is independently configured from the first DCI format, and they may be the same or different.

The content of the first indication field in the DCI for retransmitting the Configured Grant is parsed by using the same first transmission parameter set configuration as the DCI format that activates the Configured Grant; or, the content of the first indication field in the DCI for retransmitting the Configured Grant is parsed by adopting the first transmission parameter set configuration corresponding to the DCI for retransmitting the Configured Grant.

The specific parsing method is not repeated in this example.

Finally, it should be pointed out that (the configuration of) the first transmission parameter in this example is limited by (the configuration of) the second transmission parameter, and may be applicable to all transmission parameters.

Alternatively, the above condition may be applicable to some parameters, for example, the first transmission parameter or the second transmission parameter is at least one of the following:

Demodulation reference signal (DMRS) port related parameters, frequency domain frequency hopping parameters, frequency domain resource parameters, parameters of uplink control information (UCI) multiplexed to physical uplink share channel (PUSCH), and DMRS sequence initialization parameters.

When the first transmission parameter or the second transmission parameter is a parameter set, the first transmission parameter set or the second transmission parameter set is at least one of the following:

Frequency domain frequency hopping parameter set (for example, frequencyHopping), frequency domain resource parameter set (for example, ResourceAllocationType1-Granularity), parameter set (for example, uci-onPUSCH) of uplink control information (UCI) multiplexed to the physical uplink share channel (PUSCH), DMRS sequence initialization parameter set (for example, DMRSsequenceinitialization), and DMRS port related parameter set.

It may be obtained that by adopting the above solution, the first transmission parameter (set) configuration sent by the network device to the terminal device is limited by the second transmission parameter (set) configuration; and the first transmission parameter set and the second transmission parameter set correspond to the first indication field in the DCI. Therefore, the transmission parameter (set) configuration corresponding to the indication field of the same DCI has a constraint relationship. In this manner, it is possible to solve the problem of different number of bits of a certain indication field in the DCI corresponding to different transmission parameter (set) configurations.

Figure 6:
FIG. 6 is a schematic structural view of the constituents of a terminal device according to an embodiment of the present disclosure.

An embodiment of the present disclosure provides a terminal device, as shown in FIG. 6, including:

A first communication unit 61 receives the first transmission parameter.

The first transmission parameter is configured to determine the number of bits of the first indication field in the DCI; the first transmission parameter and the second transmission parameter correspond to the first indication field in the DCI.

Figure 7:
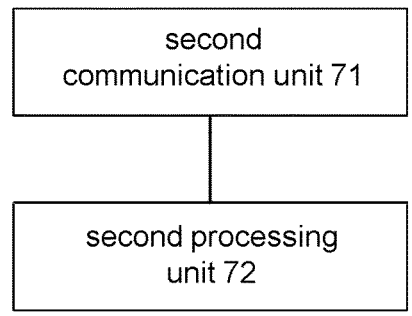
FIG. 7 is a schematic structural view of the constituents of a network device according to an embodiment of the present disclosure.

An embodiment of the present disclosure further provides a transmission network device, as shown in FIG. 7, including:

A second communication unit 71 receives the first transmission parameter.

The first transmission parameter is configured to determine the number of bits of the first indication field in the DCI; the first transmission parameter and the second transmission parameter correspond to the first indication field in the DCI.

The first transmission parameter includes: at least one transmission parameter in the transmission parameters of the Configured Grant.

And/or, the second transmission parameter includes: at least one transmission parameter in the uplink data transmission parameters, or at least one transmission parameter agreed by a protocol.

It should be understood that both the first transmission parameter and the second transmission parameter may include one or more transmission parameters. When the first transmission parameter includes multiple transmission parameters, the first transmission parameter may be referred to as the first transmission parameter set. Similarly, the second transmission parameter may be regarded as the second transmission parameter set when including multiple transmission parameters.

The number of bits of the first indication field determined based on the first transmission parameter is not greater than the number of bits of the first indication field determined based on the second transmission parameter. It can be interpreted that the first transmission parameter set configuration is limited by the second transmission parameter set configuration. More specifically, the following may be included:

The number of bits of the first indication field determined based on the first transmission parameter is less than the number of bits of the first indication field determined based on the second transmission parameter.

Alternatively, the number of bits of the first indication field determined based on the first transmission parameter is equal to the number of bits of the first indication field determined based on the second transmission parameter.

Based on the above description, the present embodiment is described in detail below with reference to examples.

Example 1

This example is applicable to all DCI formats supported by the terminal and can be used for uplink scheduling. The second transmission parameter is a transmission parameter corresponding to the first indication field with the least number of bits in all DCI formats used for uplink scheduling.

Specifically, the second transmission parameter set configuration is a transmission parameter set configuration of the first indication field corresponding to the least number of bits in all DCI formats used for uplink scheduling.

Further, in this example, the transmission parameters of the first indication field corresponding to the least number of bits in all DCI formats used for uplink scheduling are interpreted as: the transmission parameter with the least number of bits in the first indication field in all DCI formats used for uplink scheduling is used as the second transmission parameter.

The first transmission parameter may be composed of at least one transmission parameter in the transmission parameters of the Configured Grant. The second transmission parameter may be composed of at least one transmission parameter in the uplink data transmission parameters, or composed of at least one transmission parameter agreed in the protocol.

In addition, all DCI formats used for uplink scheduling include at least: DCI format 0-1 and DCI format 0-2.

Or, all DCI formats used for uplink scheduling at least include: DCI format 0-0, DCI format 0-1, and DCI format 0-2.

The first communication unit of the terminal device receives the first transmission parameter and the second transmission parameter.

For example, the terminal device receives ConfiguredGrantConfig and PUSCH-Config (Physical Uplink Share Channel Configuration). The relevant descriptions about the first transmission parameter set configuration and the second transmission parameter configuration are the same as those described above, and will not be repeated here.

The first communication unit of the terminal device receives the DCI that activates the Configured Grant.

The first processing unit 62 further included in the terminal device determines the number of bits of the first indication field in the DCI that activates the Configured Grant. The first processing unit 62 of the terminal device parses the first indication field according to the first transmission parameter (set) configuration.

The DCI format for activating the Configured Grant is one of all the DCI formats used for uplink scheduling, or one of all the DCI formats for activating the Configured Grant.

The first indication field is one of at least one indication field of the DCI for activating the Configured Grant.

The first processing unit 62 of the terminal device determines the number of bits of the first indication field according to at least one transmission parameter in the uplink data transmission parameters. In addition, the network device may further include a second processing unit 72, which determines the number of bits of the first indication field according to at least one transmission parameter in the uplink data transmission parameters.

The first indication field is one of multiple DCI fields included in the DCI that activates the Configured Grant. That is to say, one DCI may contain multiple indication fields, and these indication fields can be respectively regarded as the first indication field. Different first indication fields may correspond to different second transmission parameter (set) configurations and first transmission parameter (set) configurations (on the network device side). However, for different first indication fields, the constraint rules for the related second transmission parameter (set) configurations and the first transmission parameter (set) configurations are the same as those described above in this example, so no further details are repeated here.

It should be pointed out that although the above example takes the DMRS port parameter configuration as an example, in actual practice, the first transmission parameter or the second transmission parameter is at least one of the following:

Demodulation reference signal DMRS port related parameters, frequency domain frequency hopping parameters, frequency domain resource parameters, parameters of uplink control information UCI multiplexed to physical uplink share channel PUSCH, and DMRS sequence initialization parameters.

When the first transmission parameter or the second transmission parameter is a parameter set, the first transmission parameter set or the second transmission parameter set is at least one of the following:

Frequency domain frequency hopping parameter set (for example, frequencyHopping), frequency domain resource parameter set (for example, ResourceAllocationType1-Granularity), parameter set (for example, uci-onPUSCH) of uplink control information (UCI) multiplexed to the physical uplink share channel (PUSCH), DMRS sequence initialization parameter set (for example, DMRSsequenceinitialization), and DMRS port related parameter set.

Certainly, in addition to the parameters listed above, the target transmission parameter (set) configuration may further include more parameters, which may be set according to actual conditions, and no further details are incorporated here.

Example 2

This example applies to all DCI formats used for Configured Grant transmission. The second transmission parameter is a transmission parameter corresponding to the first indication field with the least number of bits in the DCI format used for Configured Grant transmission.

Specifically, the second transmission parameter set configuration is a transmission parameter set configuration of the first indication field corresponding to the least number of bits in the DCI format used for the Configured Grant transmission.

In this example, the second transmission parameter is the transmission parameter corresponding to the first indication field with the least number of bits in the DCI format used for the Configured Grant transmission, which may be interpreted as: the transmission parameter corresponding to the least number of bits corresponding to the first indication field in the DCI format used for Configured Grant transmission is used as the second transmission parameter.

The first transmission parameter set may be composed of at least one transmission parameter in the transmission parameters of the Configured Grant. The second transmission parameter set may be composed of at least one transmission parameter in the uplink data transmission parameters, or composed of at least one transmission parameter agreed in the protocol.

The number of bits of the first indication field determined by the second parameter (set) is the minimum value of the number of bits of the first indication field in all DCI formats used to activate the Configured Grant.

The first communication unit 61 of the terminal device receives the first transmission parameter and the second transmission parameter.

The first communication unit 61 of the terminal device receives the DCI that activates the Configured Grant.

The first processing unit 62 of the terminal device determines the number of bits of the first indication field in the DCI that activates the Configured Grant; the terminal device parses the first indication field according to the first transmission parameter.

The DCI format for activating the Configured Grant is one of all the DCI formats used for uplink scheduling, or one of all the DCI formats for activating the Configured Grant.

The first indication field is one of at least one indication field of the DCI for activating the Configured Grant.

The first processing unit 62 of the terminal device or the second processing unit 72 of the network device determines the number of bits of the first indication field according to at least one transmission parameter in the uplink data transmission parameters.

Example 3

In this example, the second transmission parameter is the transmission parameter corresponding to the first indication field with the largest number of bits in all DCI formats used for uplink scheduling. Alternatively, the second transmission parameter is the transmission parameter corresponding to the first indication field with the largest number of bits in the DCI format used for Configured Grant transmission.

The number of bits of the first indication field determined by the second parameter (set) is the maximum value of the number of bits of the first indication field in all DCI formats used for Configured Grant transmission. Alternatively, the number of bits of the first indication field determined by the second parameter (set) may be used for the maximum value of the number of bits of the first indication field in all DCI formats used for uplink scheduling.

The Configured Grant transmission may be activated Configured Grant or scheduled Configured Grant retransmission.

The first communication unit 61 of the terminal device receives the DCI that activates the Configured Grant, and the first processing unit 62 of the terminal device determines a corresponding transmission parameter (set) configuration according to the DCI format of the DCI that activates the Configured Grant, and parses the DCI that activates the Configured Grant.

The processing of this step is described in detail in several conditions.

Condition 1: The first processing unit 62 of the terminal device parses the first indication field according to the first transmission parameter in a case that the DCI for activating the Configured Grant is the third DCI format.

The third DCI format is DCI format 0-1.

Correspondingly, the second processing unit of the network device configures the first indication field according to the first transmission parameter in the case that the DCI to be sent to activate the Configured Grant is the third DCI format.

The condition may further include: in the case that the DCI for activating the Configured Grant is the third DCI format, determining the number of bits of the first indication field according to the second transmission parameter, and parsing the first indication field according to the first transmission parameter.

Condition 2: The first processing unit 62 of the terminal device parses the first indication field according to the first transmission parameter in a case that the DCI for activating the Configured Grant is the fourth DCI format.

Alternatively,

In the case that the DCI for activating the Configured Grant is the fourth DCI format, parsing the first indication field according to the second transmission parameter; or, In the case that the DCI for activating the Configured Grant is the fourth DCI format, parsing the first indication field according to the first transmission parameter and the second transmission parameter.

The fourth DCI format is DCI format 0-2.
Furthermore:
Condition 2.1:

In a case that the DCI for activating the Configured Grant is the fourth DCI format, if the first processing unit 62 of the terminal device determines that, according to the second transmission parameter, the number of bits of the first indication field is less than the number of bits of the first indication field determined according to the first transmission parameter, then the first indication field corresponds to part of the value corresponding to the first transmission parameter.

Condition 2.2: The terminal parses the 3 bits in the antenna port field, and configures parameters (second transmission parameters) according to the DMRS for DCI format 0-2 in PUSCH-Config, such as dmrs-UplinkForPUSCH-MappingTypeA-DCIformat0-2 and dmrs-UplinkFor-PUSCH-MappingTypeB-DCIformat0-2, thus determining the information indicated by the antenna port.

Condition 2.3: The terminal parses the 3 bits in the antenna port field, and configures parameters (second transmission parameters) according to the DMRS for DCI format 0-2 in PUSCH-Config, such as dmrs-UplinkForPUSCH-MappingTypeA-DCIformat0-2 and dmrs-UplinkFor-PUSCH-MappingTypeB-DCIformat0-2, and the first transmission parameter, such as cg-DMRS-Configuration, thus jointly determining the information indicated by the antenna port.

In condition 3, the second transmission parameter (set) configuration is a transmission parameter (set) configuration corresponding to the first indication field of the first DCI format, and the first DCI format is one of all the DCI formats used for uplink scheduling.

This situation is applicable to the scenario where the DCI format is specified, that is, the second transmission parameter (set) configuration is the transmission parameter (set) configuration corresponding to the first indication field of the specified first DCI format.

The first DCI format is agreed by the protocol or configured by the network. That is, the specified first DCI format is specified by the protocol, for example, in some cases, only the first DCI format can be used for transmission; or, it may be that the network device specifies that only the first DCI format is used for transmission at a certain occasion (or within a certain period of time).

The first DCI format is DCI format 0-1.

In this condition, the second transmission parameter may be used to determine the number of bits of the first indication field in the DCI. Then, the first indication field may be parsed through the first transmission parameter, or the protocol stipulates that the second transmission parameter is used to parse the first indication field.

In condition 4, the second transmission parameter (set) configuration is a transmission parameter corresponding to the first indication field in the second DCI format, and the second DCI format is one of all DCI formats used for the Configured Grant transmission.

The only difference between the above condition and condition 3 is that the second DCI format is one of all DCI formats used for the Configured Grant transmission. Specifically, the second DCI format may also be agreed by a protocol or configured by a network. The second DCI format is DCI format 0-1. Other details will not be repeated here.

Example 4

The foregoing examples mainly focus on the processing of activating the DCI of the Configured Grant, and this example describes the related processing of retransmitting the DCI of the Configured Grant.

The network device sends the DCI that retransmits the Configured Grant; correspondingly, the terminal device receives the DCI that retransmits the Configured Grant.

The DCI format for retransmitting Configured Grant is consistent with the DCI format for activating the Configured Grant.

The DCI format for activating the Configured Grant needs to be consistent with the scheduling DCI format for retransmitting the Configured Grant.

For example, the terminal receives the first DCI sent by the network device to activate the Configured Grant, and the first DCI is in the first DCI format.

The terminal receives the second DCI sent by the network device for scheduling retransmission of the Configured Grant, and the second DCI is in the second DCI format. The second DCI format is the same as the first DCI format.

Technical advantages: The initial transmission and retransmission of the Configured Grant can maintain a consistent transmission configuration and reduce the complexity of the terminal.

Correspondingly, the processing method for retransmitting the DCI of the Configured Grant may be the same as the foregoing example, and details are not repeated here.

Example 5

The network device sends the DCI that retransmits the Configured Grant; correspondingly, the terminal device receives the DCI that retransmits the Configured Grant.

The DCI format for retransmitting the Configured Grant is independent of the DCI format for activating the Configured Grant.

The DCI format for activating the Configured Grant may be inconsistent with the scheduling DCI format for retransmitting the Configured Grant.

The terminal receives the first DCI for activating Configured Grant, and the first DCI is the first DCI format.

The terminal receives the second DCI for scheduling the retransmission of the Configured Grant, and the second DCI is a second DCI format. The second DCI format is independently configured from the first DCI format, and they may be the same as or different from each other.

The content of the first indication field in the DCI of the retransmitted Configured Grant is parsed by using the first transmission parameter (set) configuration which is the same as the DCI format that activates the Configured Grant; or, the content of the first indication field in the DCI for retransmitting Configured Grant is parsed by using the first transmission parameter (set) configuration corresponding to the DCI for retransmitting the Configured Grant.

The specific parsing method is not repeated in this example.

Finally, it should be pointed out that the first transmission parameter (set) configuration in this example is limited to the second transmission parameter (set) configuration, and may be applicable to all transmission parameters.

Alternatively, the first transmission parameter or the second transmission parameter is at least one of the following:

Demodulation reference signal (DMRS) port related parameters, frequency domain frequency hopping parameters, frequency domain resource parameters, parameters of uplink control information (UCI) multiplexed to physical uplink share channel (PUSCH), and DMRS sequence initialization parameters.

When the first transmission parameter or the second transmission parameter is a parameter set, the first transmission parameter set or the second transmission parameter set is at least one of the following:

Frequency domain frequency hopping parameter set (for example, frequencyHopping), frequency domain resource parameter set (for example, ResourceAllocationType1-Granularity), parameter set (for example, uci-onPUSCH) of uplink control information (UCI) multiplexed to the physical uplink share channel (PUSCH), DMRS sequence initialization parameter set (for example, DMRSsequenceinitialization), and DMRS port related parameter set.

It may be obtained that by adopting the above solution, the first transmission parameter set configuration sent by the network device to the terminal device is limited by the second transmission parameter (set) configuration; and the first transmission parameter and the second transmission parameter correspond to the first indication field in the DCI. Therefore, the transmission parameter (set) configuration corresponding to the indication field of the same DCI has a constraint relationship. In this manner, it is possible to solve the problem of different number of bits of a certain indication field in the DCI corresponding to different transmission parameter (set) configurations.

Figure 8:
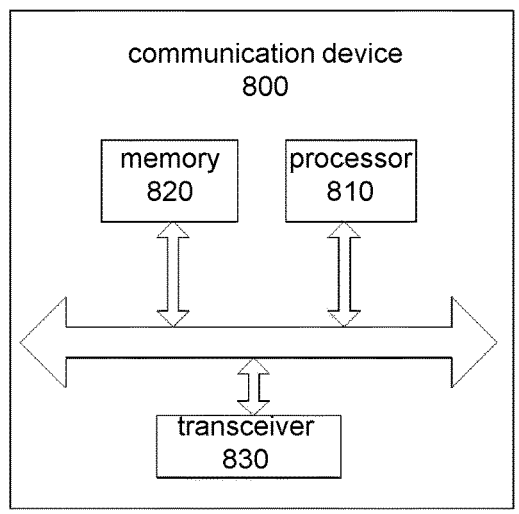
FIG. 8 is a schematic structural view of the constituents of a communication device according to an embodiment of the present disclosure.

FIG. 8 is a schematic structural view of a communication device 800 according to an embodiment of the present disclosure. The communication device in this embodiment may be specifically one of a terminal device and a network device in the foregoing embodiments. The communication device 800 shown in FIG. 8 includes a processor 810, and the processor 810 may invoke and execute a computer program from a memory to implement the method in the embodiment of the present disclosure.

Optionally, as shown in FIG. 8, the communication device 800 may further include a memory 820. The processor 810 may invoke and execute a computer program from the memory 820 to implement the method in the embodiment of the present disclosure.

The memory 820 may be a separate device independent of the processor 810, or may be integrated in the processor 810.

Optionally, as shown in FIG. 8, the communication device 800 may further include a transceiver 830, and the processor 810 may control the transceiver 830 to communicate with other devices, specifically, may send information or data to other devices, or receive information or data sent by other devices.

The transceiver 830 may include a transmitter and a receiver. The transceiver 830 may further include antennas, and the number of the antennas may be one or more.

Optionally, the communication device 800 may specifically be a network device in this embodiment of the present disclosure, and the communication device 800 may implement the corresponding processes implemented by the network device in various methods in the embodiment of the present disclosure. For brevity, details are not repeated here.

Optionally, the communication device 800 may specifically be a terminal device or a network device in the embodiment of the present disclosure, and the communication device 800 may implement the corresponding processes implemented by the mobile terminal/terminal device in various methods of the embodiment of the present disclosure. For brevity, details are not repeated here.

For example, the first processing unit of the above terminal device may be implemented by the processor 810 in the communication device 800; or, the second processing unit of the network device may be implemented by the processor 810 in the communication device 800.

The first communication unit of the above terminal device may be implemented by the transceiver 830 in the communication device 800; or, the second communication unit of the network device may be implemented by the transceiver 830 of the communication device 800.

Figure 9:
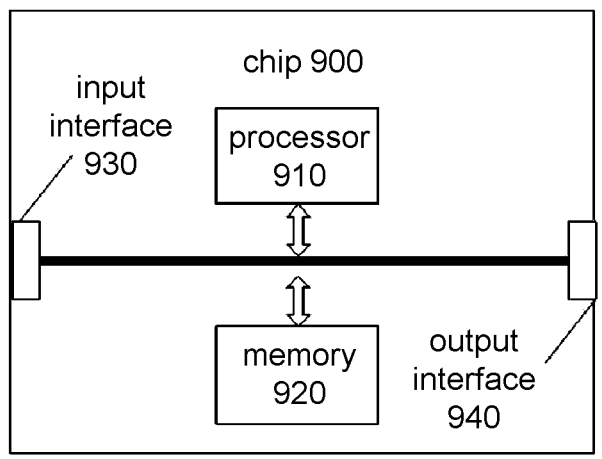
FIG. 9 is a schematic block diagram of a chip according to an embodiment of the present disclosure.

FIG. 9 is a schematic structural view of a chip according to an embodiment of the present disclosure. The chip 900 shown in FIG. 9 includes a processor 910, and the processor 910 may invoke and execute a computer program from a memory to implement the method in the embodiment of the present disclosure.

Optionally, as shown in FIG. 9, the chip 900 may further include a memory 920. The processor 910 may invoke and execute a computer program from the memory 920 to implement the method in the embodiment of the present disclosure.

The memory 920 may be a separate device independent of the processor 910, or may be integrated in the processor 910.

Optionally, the chip 900 may further include an input interface 930. The processor 910 may control the input interface 930 to communicate with other devices or chips, and specifically, may acquire information or data sent by other devices or chips.

Optionally, the chip 900 may further include an output interface 940. The processor 910 may control the output interface 940 to communicate with other devices or chips, and specifically, may output information or data to other devices or chips.

Optionally, the chip may be applied to one of a terminal device, an access network node, and a core network device in the embodiment of the present disclosure, and the chip may implement the corresponding processes implemented by the terminal device in various methods of the embodiment of the present disclosure. For brevity, details are not repeated here.

It should be understood that the chip mentioned in the embodiments of the present disclosure may also be referred to as a system-on-chip, a SoC, a system-level integration, or a SLI, or the like.

It should be understood that the processor in this embodiment of the present disclosure may be an integrated circuit chip, which has the capability of processing signals. In the implementation process, various steps of the above method embodiments may be completed by an integrated logic circuit in the form of hardware in a processor or an instruction in the form of software. The above-mentioned processor may be a general-purpose processor, a digital signal processor (DSP), an application specific integrated circuit (ASIC), a field programmable gate array (FPGA) or other programmable logic devices, discrete gate or transistor logic devices, and discrete hardware components. Various methods, steps, and logical block diagrams disclosed in the embodiments of the present may can be implemented or executed. A general-purpose processor may be a microprocessor or the processor may be any conventional processor or the like. The steps of the method disclosed in conjunction with the embodiments of the present disclosure may be directly embodied as executed by a hardware decoding processor, or executed by a combination of hardware and software modules in the decoding processor. The software module may be located in random access memory, flash memory, read-only memory, programmable read-only memory or electrically erasable programmable memory, registers and other storage media that are well developed in the field. The storage medium is located in the memory, and the processor reads the information in the memory, and completes the steps of the above method in combination with the hardware thereof.

It can be understood that the memory in the embodiment of the present disclosure may be a volatile memory or a non-volatile memory, or may include both volatile and non-volatile memory. The non-volatile memory may be Read-Only Memory (ROM), Programmable Read-Only Memory (PROM), Erasable Programmable Read-Only Memory (EPROM), Electrically Erasable Programmable Read-Only Memory (EPROM), or flash memory. Volatile memory may be Random Access Memory (RAM), which serves as an external cache. By way of example and not limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)) and Direct Rambus RAM (DR RAM). It should be noted that the memory of the systems and methods described herein is intended to include, but not be limited to, these and any other suitable types of memory.

It should be understood that the above-mentioned memory is an example only and not limited thereto. For example, the memory in this embodiment of the present disclosure may also be a static random access memory (static RAM, SRAM), a dynamic random access memory (dynamic RAM, DRAM), synchronous dynamic random access memory (synchronous DRAM, SDRAM), double data rate SDRAM (DDR SDRAM), enhanced synchronous dynamic random access memory (enhanced SDRAM, ESDRAM), synch link DRAM (SLDRAM) and Direct Rambus RAM (DR RAM) and so on. That is, memory in embodiments of the present disclosure is intended to include, but not be limited to, these and any other suitable types of memory.

Figure 10:
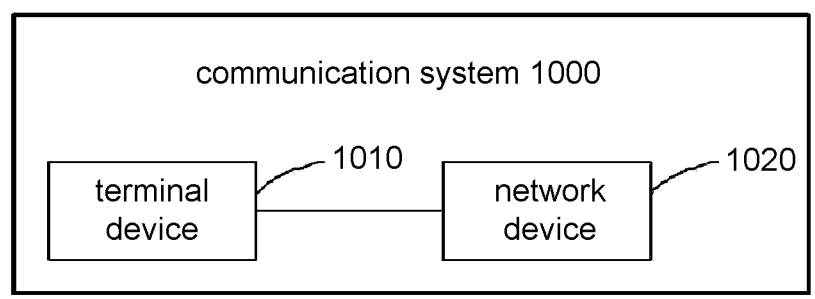
FIG. 10 is a schematic view 2 of a communication system architecture according to an embodiment of the present disclosure.

FIG. 10 is a schematic block diagram of a communication system 1000 provided by an embodiment of the present application. As shown in FIG. 10, the communication system 1000 includes a terminal device 1010 and a network device 1020.

The terminal device 1010 may be used to implement the corresponding functions implemented by the UE in the above method, and the network device 1020 may be used to implement the corresponding functions implemented by the network device in the above method. For brevity, details are not repeated here. The network device may be one of an access network node and a core network device.

Embodiments of the present disclosure further provide a computer-readable storage medium for storing a computer program.

Optionally, the computer-readable storage medium may be applied to a network device or a terminal device in the embodiments of the present disclosure, and the computer program enables the computer to execute the corresponding processes implemented by the network device in various methods of the embodiments of the present disclosure. For brevity, details are not repeated here.

Embodiments of the present disclosure further provide a computer program product, including computer program instructions.

Optionally, the computer program product may be applied to a network device or a terminal device in the embodiment of the present disclosure, and the computer program instructions enable the computer to execute the corresponding process implemented by the network device in various methods in the embodiment of the present disclosure. For brevity, details are not repeated here.

The embodiment of the present disclosure further provides a computer program.

Optionally, the computer program may be applied to the network device or terminal device in the embodiment of the present disclosure, and when the computer program is executed on the computer, the computer is enabled to execute the corresponding processes implemented by the network device in various methods in the embodiment of the present disclosure. For brevity, details are not repeated here.

Those of ordinary skill in the art can realize that the units and algorithm steps of each example described in conjunction with the embodiments disclosed herein can be implemented in electronic hardware, or a combination of computer software and electronic hardware. Whether these functions are performed in hardware or software depends on the specific application and design constraints of the technical solution. Skilled practitioners may implement the described functionality by using different methods for each particular application, but such implementations should not be considered beyond the scope of the present disclosure.

Those skilled in the art can clearly understand that, for the convenience and brevity of description, the specific operation process of the system, device and unit described above may refer to the corresponding process in the foregoing method embodiments, and details will not be repeated here.

In the several embodiments provided by the present disclosure, it should be understood that the disclosed systems, devices and methods may be implemented in other manners. For example, the device embodiments described above are only illustrative. For example, the categorization of the units is only a categorization of logical function. In actual implementation, there may be other categorization methods. For example, multiple units or components may be combined or can be integrated into another system, or some features can be ignored, or not implemented. On the other hand, the shown or discussed mutual coupling or direct coupling or communication connection may be performed through some interfaces, indirect coupling or communication connection of devices or units may be in electrical, mechanical or other forms.

The units described as separate components may or may not be physically separated, and components displayed as units may or may not be physical units, that is, may be located in one place, or may be distributed to multiple network units. Some or all of the units may be selected according to actual needs to achieve the purpose of the solution in this embodiment.

In addition, each functional unit in various embodiments of the present disclosure may be integrated into one processing unit, or each unit may exist physically alone, or two or more units may be integrated into one unit.

The functions, if implemented in the form of software functional units and sold or used as independent products, may be stored in a computer-readable storage medium. Based on such understanding, the technical solution of the present disclosure in essence, or the part that contributes to the conventional technology or the part of the technical solution may be embodied in the form of a software product. The computer software product is stored in a storage medium, including several instructions that are used to enable a computer device (which may be a personal computer, a server, or a network device, etc.) to execute all or part of the steps of the methods described in the various embodiments of the present disclosure. The aforementioned storage medium includes: U disk, mobile hard disk, read-only memory (ROM), random access memory (RAM), magnetic disk or optical disk and other media that can store program codes.

The above are only specific embodiments of the present disclosure, but the scope to be protected by the present disclosure is not limited thereto. Any person skilled in the art can easily think of changes or substitutions within the technical scope disclosed by the present disclosure, and the changes or substitutions should fall within the scope to be protected by the present disclosure. Therefore, the scope to be protected by the present disclosure should be based on the scope to be protected by the claims.

What is claimed is:

1. A transmission parameter determination method, comprising:
   receiving, by a terminal device, a first transmission parameter;
   wherein the first transmission parameter is used for determining a number of bits of a first indication field in a DCI (downlink control information); the first transmission parameter and a second transmission parameter corresponding to the first indication field in the DCI, the first transmission parameter is comprised in a configuration of Configured Grant (ConfiguredGrantConfig), the second transmission parameter is comprised in Physical Uplink Share Channel Configuration (PUSCH-Config), the number of bits of the first indication field determined based on the first transmission parameter in the ConfiguredGrantConfig is less than or equal to the number of bits of the first indication field determined based on the second transmission parameter in the PUSCH-Config.

2. The method according to claim 1, wherein the first transmission parameter comprises: at least one transmission parameter among transmission parameters of Configured Grant;
   and/or,
   the second transmission parameter comprises: at least one transmission parameter among uplink data transmission parameters, or at least one transmission parameter agreed by a protocol.

3. The method according to claim 2, wherein the method further comprises:
   receiving, by the terminal device, a DCI that activates the Configured Grant.

4. The method according to claim 3, wherein the method further comprises:
   receiving, by the terminal device, a DCI that retransmits the Configured Grant;
   wherein a DCI format for retransmitting the Configured Grant is independent of a DCI format for activating the Configured Grant.

5. The method according to claim 1, wherein
   the second transmission parameter is a transmission parameter corresponding to the first indication field with the least number of bits in all DCI formats used for uplink scheduling; or,
   the second transmission parameter is a transmission parameter corresponding to the first indication field with the least number of bits in a DCI format used for Configured Grant transmission; or,
   the second transmission parameter is a transmission parameter corresponding to the first indication field with the largest number of bits in all the DCI formats used for the uplink scheduling; or,
   the second transmission parameter is a transmission parameter corresponding to the first indication field with the largest number of bits in the DCI format used for the Configured Grant transmission; or,
   the second transmission parameter is a transmission parameter corresponding to the first indication field of a first DCI format, and the first DCI format is one of all the DCI formats used for the uplink scheduling; or
   the second transmission parameter is a transmission parameter corresponding to the first indication field of a second DCI format, and the second DCI format is one of all the DCI formats used for the Configured Grant transmission.

6. The method according to claim 1, wherein the first transmission parameter or the second transmission parameter comprises at least one of the following:
   demodulation reference signal (DMRS) port related parameters, frequency domain frequency hopping parameters, frequency domain resource parameters, parameters of uplink control information (UCI) multiplexed to physical uplink share channel (PUSCH), and DMRS sequence initialization parameters.

7. A terminal device, comprising:
   a transceiver; and a processor, configured for:
receiving, through the transceiver, a first transmission parameter;
wherein the first transmission parameter is used for determining a number of bits of a first indication field in a DCI; a first transmission parameter and a second transmission parameter correspond to the first indication field in the DCI, the first transmission parameter is comprised in a configuration of Configured Grant (ConfiguredGrantConfig), the second transmission parameter is comprised in Physical Uplink Share Channel Configuration (PUSCH-Config), wherein the number of bits of the first indication field determined based on the first transmission parameter in the ConfiguredGrantConfig is less than or equal to the number of bits of the first indication field determined based on the second transmission parameter in the PUSCH-Config.

8. The terminal device according to claim 7, wherein the first transmission parameter comprises: at least one transmission parameter among transmission parameters of Configured Grant;
and/or,
the second transmission parameter comprises: at least one transmission parameter among uplink data transmission parameters, or at least one transmission parameter agreed by a protocol.

9. The terminal device according to claim 8, wherein the processor is configured for receiving, through the transceiver, a DCI that activates the Configured Grant.

10. The terminal device according to claim 7, wherein,
the second transmission parameter is a transmission parameter corresponding to the first indication field with the least number of bits in all DCI formats used for uplink scheduling; or,
the second transmission parameter is a transmission parameter corresponding to the first indication field with the least number of bits in a DCI format used for Configured Grant transmission; or,
the second transmission parameter is a transmission parameter corresponding to the first indication field with the largest number of bits in all the DCI formats used for the uplink scheduling; or,
the second transmission parameter is a transmission parameter corresponding to the first indication field with the largest number of bits in the DCI format used for the Configured Grant transmission; or,
the second transmission parameter is a transmission parameter corresponding to the first indication field of a first DCI format, and the first DCI format is one of all the DCI formats used for the uplink scheduling; or
the second transmission parameter is a transmission parameter corresponding to the first indication field of a second DCI format, and the second DCI format is one of all the DCI formats used for the Configured Grant transmission.

11. The terminal device according to claim 10, wherein the first communication unit receives a DCI that retransmits the Configured Grant;
wherein a DCI format for retransmitting the Configured Grant is independent of a DCI format for activating the Configured Grant.

12. The terminal device according to claim 7, wherein the first transmission parameter or the second transmission parameter comprises at least one of the following:
demodulation reference signal (DMRS) port related parameters, frequency domain frequency hopping parameters, frequency domain resource parameters, parameters of uplink control information (UCI) multiplexed to physical uplink share channel (PUSCH), and DMRS sequence initialization parameters.

13. A network device, comprising:
a transceiver; and
a processor, configured for:
sending, through the transceiver, a first transmission parameter;
wherein the first transmission parameter is used for determining a number of bits of a first indication field in a DCI; the first transmission parameter and a second transmission parameter corresponding to the first indication field in the DCI, the first transmission parameter is comprised in a configuration of Configured Grant (ConfiguredGrantConfig), the second transmission parameter is comprised in Physical Uplink Share Channel Configuration (PUSCH-Config), the number of bits of the first indication field determined based on the first transmission parameter in the ConfiguredGrantConfig is less than or equal to the number of bits of the first indication field determined based on the second transmission parameter in the PUSCH-Config.

14. The network device according to claim 13, wherein, the first transmission parameter comprises: a transmission parameter among transmission parameters of Configured Grant;
and/or,
the second transmission parameter comprises: a transmission parameter among uplink data transmission parameters, or a transmission parameter agreed by a protocol.

15. The network device according to claim 13, wherein,
the second transmission parameter is a transmission parameter corresponding to the first indication field with the least number of bits in all DCI formats used for uplink scheduling; or
the second transmission parameter is a transmission parameter corresponding to the first indication field with the least number of bits in a DCI format used for Configured Grant transmission; or
the second transmission parameter is a transmission parameter corresponding to the first indication field with the largest number of bits in all the DCI formats used for the uplink scheduling; or
the second transmission parameter is a transmission parameter corresponding to the first indication field with the largest number of bits in the DCI format used for the Configured Grant transmission; or
the second transmission parameter is in a first DCI format, and the first DCI format is one of all the DCI formats used for the uplink scheduling; or
the second transmission parameter is in a second DCI format, and the second DCI format is one of all the DCI formats used for Configured Grant transmission.

16. The network device according to claim 13, wherein the processor is further configured for sending, through the transceiver, a DCI that activates the Configured Grant.

17. The network device according to claim 16, wherein the processor is further configured for sending, through the transceiver, a DCI that retransmits the Configured Grant;
wherein a DCI format that retransmits the Configured Grant is consistent with a DCI format that activates the Configured Grant.

18. The network device according to claim 13, wherein the first transmission parameter or the second transmission parameter comprises at least one of the following:
demodulation reference signal (DMRS) port related parameters, frequency domain frequency hopping parameters, frequency domain resource parameters, parameters of uplink control information (UCI) multiplexed to physical uplink share channel (PUSCH), and DMRS sequence initialization parameters.

* * * * *